United States Patent
Shu et al.

(10) Patent No.: US 7,555,772 B2
(45) Date of Patent: Jun. 30, 2009

(54) WIRELESS FIREWALL WITH TEAR DOWN MESSAGING

(75) Inventors: Jesse Shu, Palo Alto, CA (US); Yonghui Cheng, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 886 days.

(21) Appl. No.: 10/765,676

(22) Filed: Jan. 26, 2004

(65) Prior Publication Data

US 2005/0165928 A1 Jul. 28, 2005

(51) Int. Cl.
*H04L 9/00* (2006.01)
(52) U.S. Cl. ...................................................... 726/11
(58) Field of Classification Search .................... 726/11, 726/13
See application file for complete search history.

(56) References Cited

U.S. PATENT DOCUMENTS

2003/0081607 A1* 5/2003 Kavanagh .................... 370/392
2003/0117993 A1* 6/2003 Syvanne et al. ............. 370/349

FOREIGN PATENT DOCUMENTS

EP 1 317 112 A 6/2003

EP 1317112 A2 * 6/2003

OTHER PUBLICATIONS

GPRS Security Threats and Solutions, A White Paper by NetScreen Technologies, Mar. 2002.*
Check Point Software: Fire Wall-1 GX Overview, Jun. 14, 2004, http://www.checkpoint.com/products/firewall-1_gx/firewall-1gx_overview.html., pp. 1-2.
FireWall-1 GX: Advanced Security for 2.5G and 3G Wireless Infra-structures, Check Point Software Technologies Ltd., 2004, http://www.checkpoint.com/products/downloads/firewall-1_gx_datasheet.pdf., pp. 1-2.
Whitehouse, O. et al, "Attacks and Counter Measures in 2.5G and 3G Cellular IP Networks", @Stake, Inc., Mar. 2004, http://www.atstake.com/research/reports/acrobat/atstake_cellular_networks.pdf., pp. 1-29.
Gopal et al.; User Plane Firewall for 3G Mobile Network; Vehicular Technology Conference; IEEE 58th; vol. 3, Oct. 6, 2003; pp. 2117-2121.
International Search Report and Written Opinion for corresponding PCT application with a mailing date of Jun. 9, 2005; 9 pages.

* cited by examiner

*Primary Examiner*—Andrew L Nalven
(74) *Attorney, Agent, or Firm*—Harrity & Harrity, LLP

(57) ABSTRACT

Methods of screening incoming packets are provided. A first firewall detects a tunnel formation. A second firewall maintains a list of open firewall sessions. Each tunnel has one or more associated firewall sessions. The first firewall detects variable situations, such as when the tunnel is torn down, and notifies the second firewall so that, for example, the second firewall can act to clear an associated firewall session from the firewall session list. Incoming packets that are associated with firewall sessions that have been cleared from the firewall session list may not be passed through the second firewall.

16 Claims, 5 Drawing Sheets

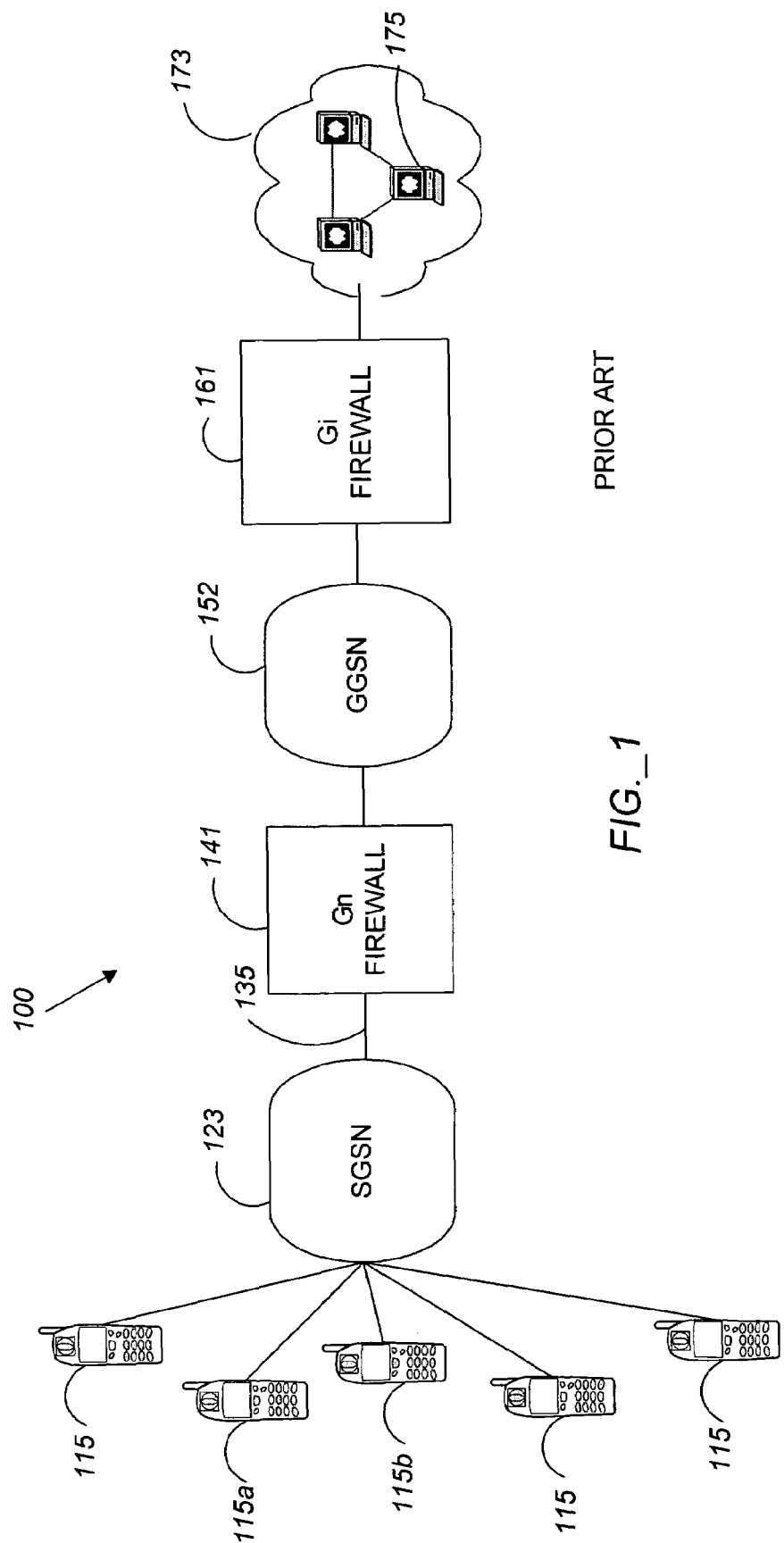
FIG._1
PRIOR ART

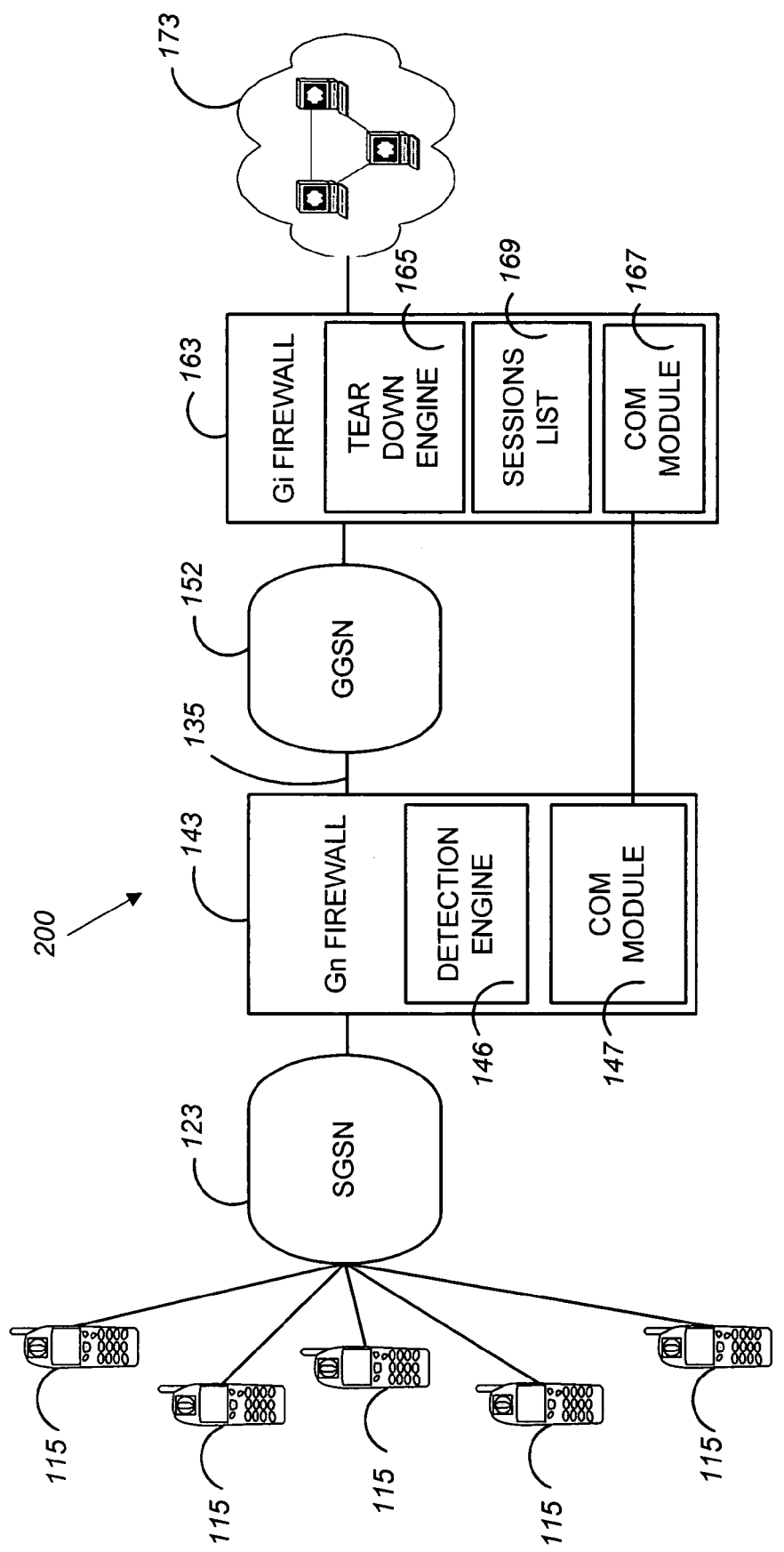
FIG._2

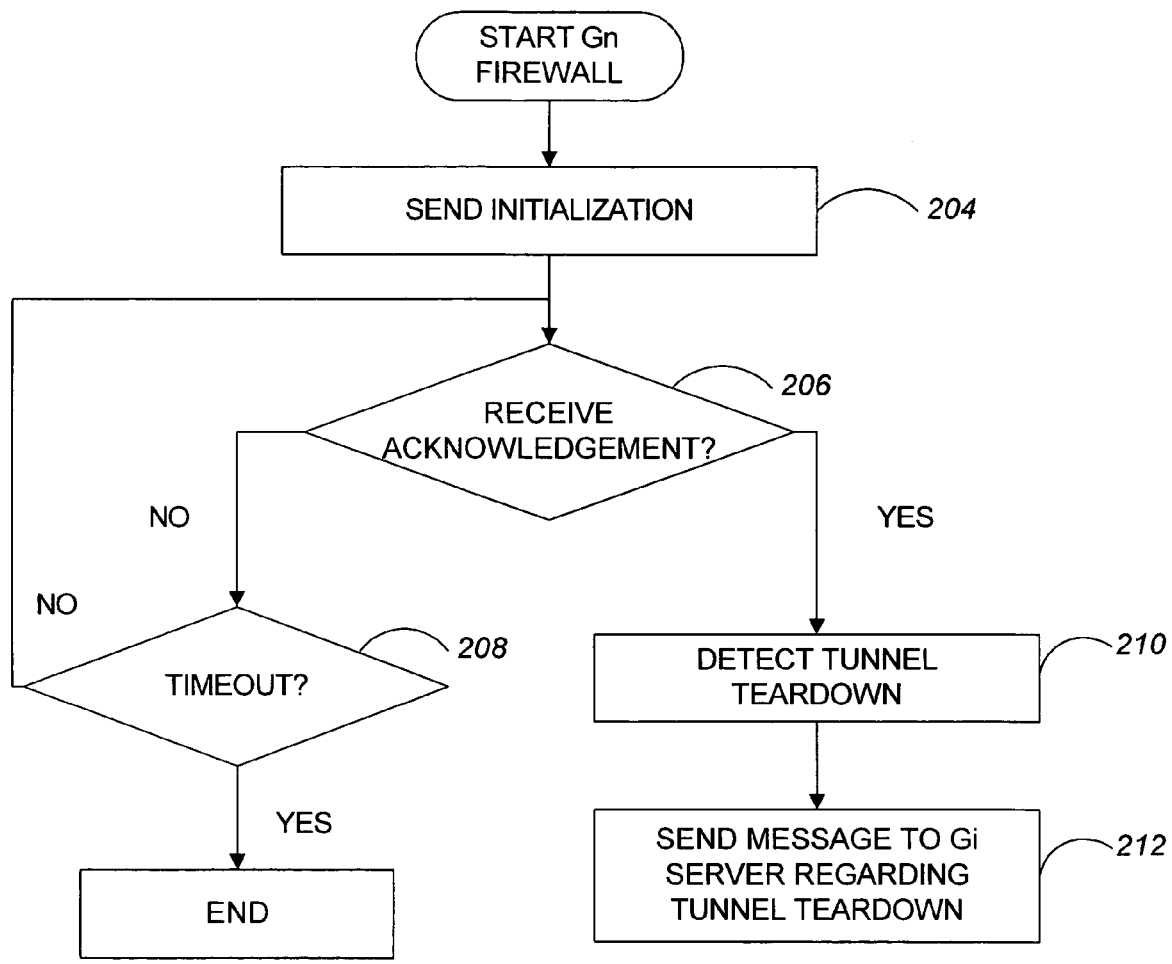
FIG._3

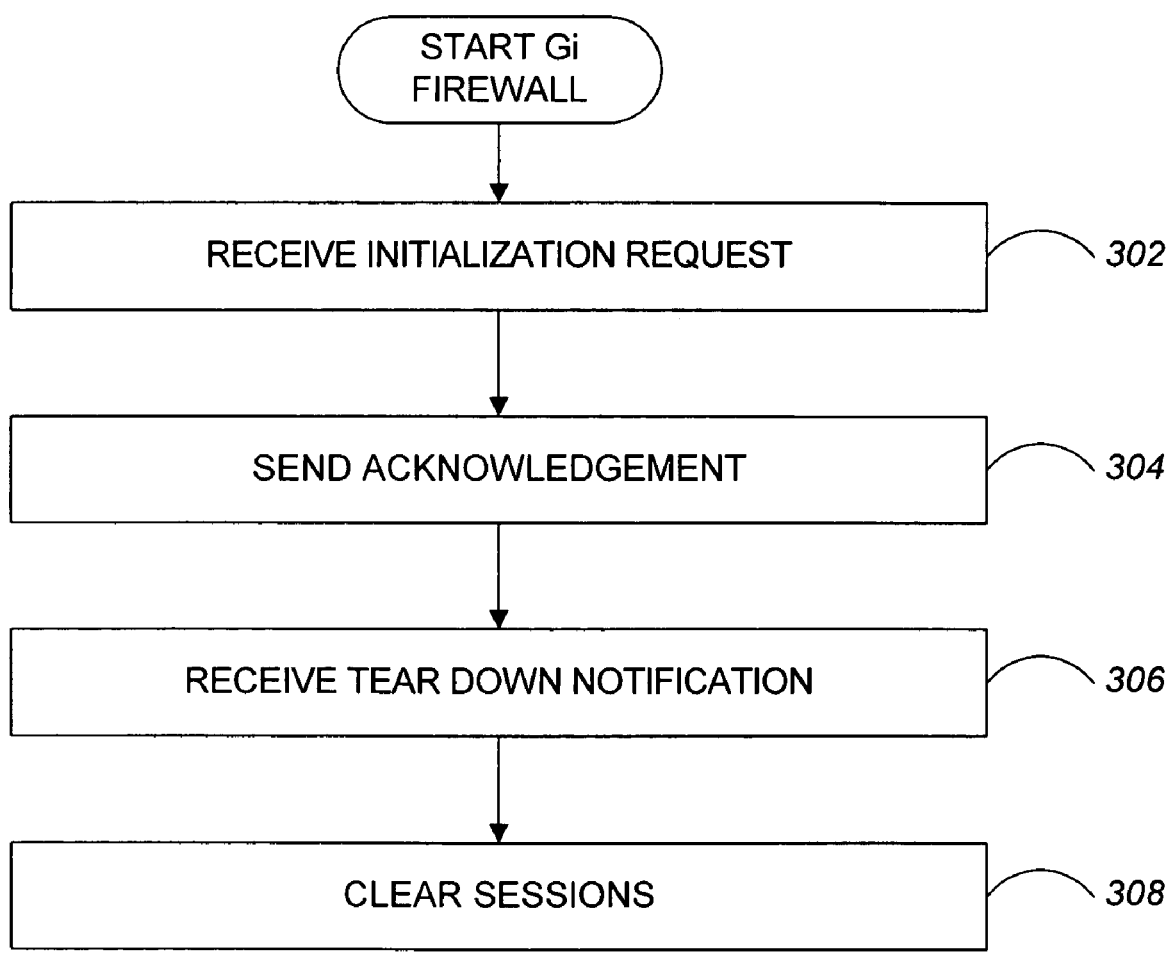
FIG._4

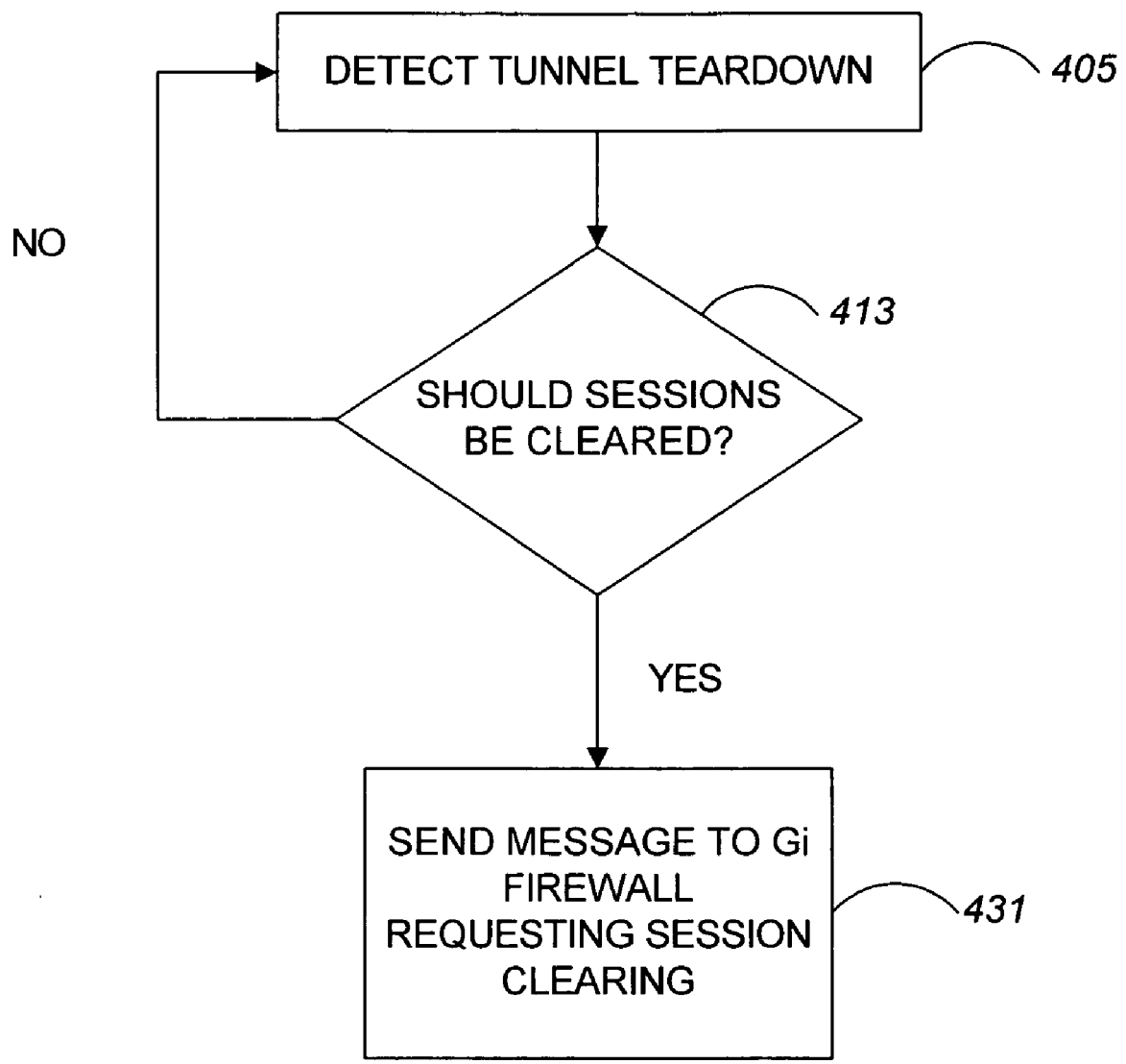
FIG. _5

WIRELESS FIREWALL WITH TEAR DOWN MESSAGING

BACKGROUND

This invention relates to wireless communication.

A General Packet Radio Service (GPRS) network can provide mobile computing and telephony users with packet-switched connections to data networks. A subscriber with a mobile station can connect to other mobile stations or packet data networks to send and receive information. The information sent over the GPRS network is broken up into packets. A packet includes a header and a payload. The header can include instructions and information, such as error checking information, and source and destination addresses. The payload includes data that is to be delivered to the destination.

As shown in FIG. 1, a conventional GPRS network 100 can be used to connect one or more mobile stations 115 to a packet data network, such as the Internet 173. A mobile station 115 can connect to a Serving GPRS Support Node (SGSN) 123, typically through a base station subsystem (not shown). A conventional base station subsystem is used to authenticate and track the mobile stations and manage connections. A public land mobile network (PLMN) can have multiple mobile stations and multiple SGSNs within its network. Packets can be transferred transparently between the mobile station and the Internet through GPRS network tunnels (i.e., GTP tunnels). A GTP tunnel is dynamically created between supporting nodes (e.g., SGSN and GGSN) in the GPRS network. As shown in FIG. 1, one or more GTP tunnels can be used to provide connection paths between a SGSN 123 and Gateway GPRS Support Node (GGSN) 152. Typically, one GTP tunnel is created per GPRS user at any time. GTP tunnels are identified by an associated GPRS user's IP address and each provides a given active GPRS user a path for communicating with zero to many hosts (i.e., servers) on the packet data network (e.g., the Internet). Encapsulation adds additional address and control information to packets received at the entrance to a GTP tunnel, allowing the packets to be routed from the GTP tunnel start point to the GTP tunnel endpoint without intermediary systems having to inspect the data contained in the pre-encapsulated packet. The encapsulated packet can be decapsulated once the packet reaches the GTP tunnel endpoint system (e.g., GGSN 152). In a conventional GPRS system, packets received from a mobile station at an SGSN 123 are encapsulated and pass through a GTP tunnel to the GGSN 152. Any number of routing/network components (not shown) can be interposed between the SGSNs and the GGSN.

A generic network firewall is a device that separates yet bridges networks. Network firewalls filter network traffic, forwarding legitimate traffic while otherwise processing suspect traffic (e.g., dropping suspect traffic). A GTP firewall is a generic network firewall that supports the GTP protocol. In the GPRS network, one or more GTP firewalls may be provided at the Gn or Gp interfaces in the network. For example in FIG. 1, between the SGSN 123 and the GGSN 152 is a Gn interface. A GTP firewall 141 (e.g., Gn firewall) at the Gn interface can be used to filter packets that are sent to and received by the SGSN 123. The GTP Firewall 141 can be used to ensure that the base station subsystems and other system components beyond the SGSN are not vulnerable in the event of compromise of the GGSN 152. The GTP firewall 141 can inspect packets sent through the interface and apply policies to support the security of the SGSN. The GTP Firewall 141 can be configured to inspect tunnel traffic. Further, because of its position at the SGSN interface, GTP Firewall 141 has visibility to the creation and tear down of GTP tunnels.

GGSN 152 sends packets to and receives packets from the packet data network through an interface (Gi), on which a firewall 161 (Gi firewall) can be supported. The Gi firewall 161 can filter packets sent to/from the Internet before allowing the packets to continue on to the GGSN 152. The Gi firewall 161 therefore can provide some protection for the GGSN 152 against unsolicited traffic and attacks.

As noted above, mobile stations 115 can access information from the Internet 173 in addition to contacting other mobile stations. To receive packets from an Internet site, a mobile station 115 typically needs an IP address to inform the sender where to route the packets. Not all mobile stations within a PLMN access the Internet 173 at one time, allowing for each PLMN to use a small pool of IP addresses, often fewer IP addresses than mobile stations in the network. Individual mobile stations are dynamically assigned PLMN's IP addresses as necessary to support requested communications. After communications are complete, the assigned IP addresses can be reused by other subscribers (e.g., other mobile stations). When a subscriber wishes to access the Internet 173, the subscriber uses a mobile station 115 to contact the SGSN 123 and is assigned one of the IP addresses from the pool. The assigned IP address is identified with the particular mobile station and used in the pre-encapsulated packet header for all packets associated with the given user. A GTP tunnel is created from an associated SGSN 123 to the GGSN 152 to allow the communication of packets from the mobile station to the external network. Encapsulation of packets occurs and data can pass from/to the mobile stations to/from the external network (e.g., the Internet 173). Once the mobile station 115 ends its connection, a GTP tunnel disconnect event occurs. The IP address associated with the mobile station can be returned to the IP address pool where the address can be reassigned to another mobile station 115.

In conventional GPRS networks, the GGSN 152 can track the GPRS usage or Internet 173 access for each mobile station 115. Typically the GPRS usage is tracked according to incoming and outgoing packet traffic rather than time spent on the network. The incoming and outgoing packets can be assigned to the IP address in the packet header that corresponds to the mobile station 115 using the IP address at the time of transmission. If the network continues routing packets to an IP address even after a mobile station 115 has disconnected from the network, the packet traffic may be attributed to the mobile station 115 that last used the IP address and is no longer accessing network. This can result in unacceptable charges on the mobile station subscriber's bill.

Another problem related arises due to reuse of the IP addresses. Typically the pool includes a finite number of addresses that can be discovered innocently or maliciously. The problem can be illustrated by an example. A first mobile station 115a attaches to the network and is assigned an IP address. After sending and receiving packets from the Internet 173 by way of a GTP tunnel 135, the first mobile station 115a disconnects. The GTP tunnel 135a is torn down and the IP address is returned to the pool of IP addresses. A second mobile station 115b attaches to the system and is assigned the IP address that the first mobile station 115a had been using. A new GTP tunnel 135b is constructed for the second mobile station 115b. Packets initiated from the Internet 173 with the IP address are routed through the new GTP tunnel 135b to the second mobile station 115b, regardless of whether the second mobile station 115b requested the incoming packets. This is because the second mobile station is now associated with the IP address. The packets could have been requested by the first mobile station 115a or initiated by a server on the Internet 173 that knows the IP address, and is maliciously sending messages. The GPRS usage is billed to the account associated with the second mobile station 115b, again resulting in unacceptable charges.

Malicious servers 175 on the Internet 173 can discover IP addresses from the pool of IP addresses and send packets to the IP addresses, regardless of receiving requests for packets. In conventional GPRS systems, the Gi firewall 161 does not clear firewall sessions in response to a GTP tunnel tear down. This can lead to a firewall session list not accurately reflecting active firewall sessions. This allows a server to continue to send packets through the Gi firewall 161 and potentially cause GPRS usage to be assigned to mobile station 115 even when the mobile station 115 is not requesting the downloaded packets. In addition to the billing problems noted above, unsolicited packets to a mobile station 115 can bottleneck a mobile station's receiving line, thereby slowing down desired transmissions or preventing the mobile station 115 from receiving desired packets.

SUMMARY

In general, in one aspect, the invention features a method of screening incoming packets. A request to establish a connection from a first network to a packet data network is detected. Establishment of a tunnel is detected, wherein the tunnel has a support node at each end. One of the support nodes is a gateway to the packet data network. The tunnel can be used to convey user traffic through the tunnel, wherein the user traffic can be associated with one or more firewall sessions on a firewall outside the tunnel. A tear down of the tunnel is detected. A firewall at one of the support nodes generates a request to clear the one or more firewall sessions associated with the torn down tunnel and sends the request to the firewall at the gateway where an associated session list can be updated.

In another aspect, a method of screening incoming packets includes providing a connection from a first network to a packet data network, including providing a GTP tunnel having a support node at each end. One of the support nodes is a gateway to the packet data network. A tear down of the GTP tunnel is detected. A policy is applied to determine whether to request a firewall session clear at a Gi firewall.

In yet another aspect, a method of screening incoming packets includes detecting an establishment of a firewall session between a mobile station logged onto a GPRS network and a system on a packet data network. An end to the firewall session is detected. A request is sent to a Gi firewall protecting the gateway support node from attacks from the packet data network to remove the firewall session from a firewall session list.

In another aspect, a method of screening incoming packets includes adding a firewall session identifier to a firewall session list when a new firewall session for user traffic coming out of a GTP tunnel is created, where the user traffic does not belong to an existing firewall session. Thereafter, the user traffic is allowed to pass. A message is received to indicate the firewall session is no longer active. The firewall session is then indicated as no longer being active on the firewall session list.

In another aspect, a system for screening incoming packets includes a GTP firewall and a Gi firewall. The GTP firewall has a GTP communication module. The Gi firewall has a Gi communication module that is operable to receive an instruction from the GTP communication module to tear down a firewall session, a firewall session list and a tear down engine that removes inactive firewall sessions from the firewall session list when the tear down engine receives the instruction from the GTP communication module.

Aspects of the invention can include one, more or none of the following features. A system is proposed that uses the GTP firewall to monitor the tear down of a GTP tunnel and signal the Gi firewall so that related firewall sessions are closed. By notifying the Gi firewall that a GTP tunnel is closed, the Gi firewall may drop or deny any packets related to the associated closed firewall session before the packets get to the GGSN. By dropping packets that are not related to an open firewall session, unsolicited packets may be kept out of a system. The GTP firewall can alternatively monitor firewall session tear down. A single GTP tunnel can be associated with one or more firewall sessions and tearing down the GTP tunnel may cause the one or more associated firewall sessions to be removed from or deactivated on the firewall sessions list in the Gi Firewall.

Malicious servers that send unsolicited packets may be prevented from attacking a system. Unsolicited packets may have at least two negative effects. The first may be that unsolicited packet transmission is charged to a mobile station. Another effect can be that the load on the network is increased when more packets are let into the network. At a point in the network where bandwidth is limited, such as between a mobile station and a base station subsystem, a bottleneck of transferred packets can occur. Network resources may be freed up if unsolicited traffic is decreased. Additionally, subscribers may be less likely to be billed for unsolicited packet traffic, leading to fewer customer complaints and contacts to the PLMN service provider. The dual firewall configuration and signaling can be independent of the SGSN and GGSN vendors, which may allow for greater flexibility and security. If the GTP and Gi firewalls are controlled by the same entity there is no trust problem for implementing the notification method.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of a prior art system for packet switched communications between a mobile station and land-based system.

FIG. 2 is a block diagram of a packet switched communication system that provides protection from unsolicited traffic.

FIG. 3 is a flow chart showing the steps performed by a firewall between a serving support node and a gateway support node.

FIG. 4 is a flow chart showing the steps performed by a firewall on a reference point between the gateway support node and a packet data network.

FIG. 5 is a flow chart depicting an alternate method performed by the firewall between the serving support node and a gateway support node.

Like reference symbols in the various drawings indicate like elements.

DETAILED DESCRIPTION

Referring to FIG. 2, a GPRS network 200 includes firewalls that are configured to provide a solution to the problem of unsolicited traffic reaching the GGSN 152. The GPRS network 200 is similar to a conventional GPRS network, but includes additional functionality within the firewalls (i.e., GTP Firewall 143 and Gi Firewall 163) that facilitate communication with one another at the time of tear down of GTP tunnels.

GTP Firewall 143 includes a communication module 147 that sends messages to and receives messages from a communication module 167 in the Gi Firewall 163. The communications can be in-band (using the conventional link between the two devices in the GPRS network 200) or out of band (e.g., using an external network or signaling system). GTP Firewall 143 includes a detection module 146. Detection module 146 operates to detect the tear down of GTP tunnels between a SGSN 123 and GGSN 152. More specifically, GTP Firewall 143 detects tear down by examining the GTP tunnel teardown request and response messages passed between SGSN 123 and GGSN 152. At tear down, GTP communication module 147 can send instructions to a tear down engine 165 in the Gi Firewall 163 (via communication module 167 in Gi Firewall 163).

Gi Firewall 163 includes tear down engine 165 and a flow table (e.g., a firewall session list 169). Gi Firewall 163 uses the firewall session list 169 to track the currently active firewall sessions related to active GPRS users. Typically the firewall session list 169 includes identifiers for the two communicating systems, such as the IP address assigned to a particular mobile station 115 and an IP address for a server on the Internet 173, along with other information, such as a firewall session identifier or policy information regarding inspection of packets associated with the firewall session. Typically, the Gi Firewall 163 is configured to create sessions upon receipt of traffic from GPRS users destined for the packet network (e.g., the Internet). Once sessions are created, returning traffic from the packet network to the GPRS users will be allowed to pass for all traffic with matching entries in the firewall session list 169. If any traffic originating from the packet network fails to correspond to an entry in the firewall session list 169, Gi Firewall 163 will deny the traffic. Tear down engine 165 in the Gi Firewall 163 is operable to remove/delete firewall sessions associated with the torn-down GTP tunnels in its firewall session list 169.

Referring to FIGS. 2 and 3, a method is shown for communicating by a GTP Firewall to a Gi Firewall in the GPRS network 200. GTP Firewall 143 connects via a link (i.e., in-band or out of band) to the Gi Firewall 163 and sends an initialization request to the Gi Firewall 163 (step 204). In one implementation where the GGSN's operator controls both the Gi Firewall 163 and the GTP Firewall 143 the initialization described herein may not be required. The initialization request can include a handshake, a hello message, an acknowledgement, and/or an authentication request. A check is made to determine if a properly formatted acknowledgement signal has been returned (step 206). If not, a time out loop is entered (step 208). Upon receipt of an acceptable acknowledgement, GTP Firewall 143 thereafter waits until a tear down is detected of a GTP tunnel between the GTP and Gi Firewalls, respectively (step 210). As described above, when a mobile station 115 attaches to a network, a GTP tunnel 135 is set up to connect an associated SGSN 123 to GGSN 152. The GTP tunnel 135 passes through the GTP Firewall 143, enabling the GTP Firewall 143 to safeguard the SGSN 123 from packets sent by untrusted GGSNs. The GTP Firewall 143 is operable to recognize that a new GTP tunnel 135 has been established and can monitor traffic through the new GTP tunnel 135.

At the time of tear down, the GTP Firewall 143 communicates with the Gi Firewall 163 (e.g., the GTP communication module 147 communicates with the Gi communication module 167) to signal to the Gi Firewall 163 that the GTP tunnel has been torn down (step 212). This process repeats for each GTP tunnel tear down.

Referring now to FIGS. 2 and 4, a method is shown for communicating between Gi Firewall to a GTP Firewall in the GPRS network 200. The Gi Firewall 163 receives an initialization request from the GTP Firewall 143 (step 302). Gi Firewall 163 responds with a properly formatted acknowledgement signal (e.g., Gi communication module 167 sends the acknowledgement signal to the GTP communication module 147) (step 304). As described above, the Gi Firewall 163 maintains a firewall session list 169 that includes firewall session identifiers for each active firewall session. Each packet can be associated with a firewall session by the packet's header information. A mobile station 115 disconnecting from the network ends the associated firewall session. When the mobile station 115 is disconnected the GTP tunnel 135 is no longer needed to send and receive packets from the SGSN 123 to the GGSN 152 and the GTP tunnel 135 can be torn down. As described above, the GTP Firewall 143 detects GTP tunnel tear down.

Upon detecting the GTP tunnel tear down, the GTP communication module 147 can send a message to the Gi Firewall 163. The message can include specific tear down instructions (e.g., upon receipt of the message (step 306), Gi Firewall 163 can clear an associated firewall session from the firewall session list 169 (step 308)). In one implementation, the message can include a 5 tuple of information including the source IP address, source port, protocol, destination IP address and destination port associated with the traffic on a given GTP tunnel that is to be torn down. Alternatively, the message can include information that can be used by the Gi Firewall 163 that may result in the clearing of more than one firewall session from firewall session list 169. As discussed below, the message may contain information that is evaluated against one or more policies in order to determine an appropriate response by the Gi Firewall 163.

In one implementation, the Gi Firewall 163 clears the firewall session list 169 and invalidates the IP address associated with the appropriate mobile station. In one implementation, Gi Firewall 163 examines a firewall session wing's hash table associated with a particular zone, and invalidates a wing's source IP address, i.e., the IP address of the mobile station. Thereafter, packets that the Gi Firewall 163 receives associated with the invalidated firewall session can be dropped, or inspected further to determine whether the packet should be permitted into the network.

In one implementation, in addition to or in lieu of messaging by the GTP Firewall 143 at the time of recognition of a GTP tunnel tear down, GTP firewall 143 is configured to send a message to the Gi Firewall 163 if any form of network attack is detected at the GTP firewall 143. The message content can be of the form of a notification, or an instruction so as to alert/control the Gi Firewall 163 so as to ensure the security of the GPRS network.

In one implementation, the GTP Firewall 143 and Gi Firewall 163 use a TCP based protocol for messaging that supports TCP md5 digest option (RFC2385) to provide security. The protocol can have a message format of message header+extension. The message header can indicate the message length in bytes, the message type and the transaction ID. The message type can be indicated by a number, such as 1 for a handshake, 2 for a hello, 3 for a hello-ACK and 4 for a clear firewall session. The transaction ID can be a unique number or 0 for the hello or the handshake.

In the TCP messaging implementation, the handshake message with an extension can state the message length, the message type as 1 and that the transaction ID is 0. The extension can include the version, a hello interval that the GTP Firewall 143 will wait before sending the hello to the Gi Firewall 163 and a reserved portion. In one implementation, the hello interval cannot be zero. The handshake message is sent after the connection is first established. In addition to being sent after a connection is established, the message handshake can be sent at any time. In one implementation, the hello message has no extension, the message type is 2 and the transaction ID is 0.

In one implementation, the hello acknowledgement message type is 3 and the transaction ID is the same as the last known transaction ID or 0 if there was no transaction. The hello acknowledgement can be used to acknowledge the last known transaction ID. At the same time that the acknowledgment for a hello is sent, the Gi Firewall 163 can acknowledge other previously sent transactions. In one implementation the transaction ID can either be random or sequential, but a certain degree of uniqueness is desirable.

In one implementation, the clear firewall session message is message type 4. The transaction ID is a unique number that relates to the transaction that is to clear the firewall session. The context-id describes the anchor point of a firewall session (s) on Gi firewall. With this protocol, the firewall session can be anchored on a security zone. To specify the firewall session that needs to be cleared, a context may be needed in addition to an IP address. When a firewall session is cleared or expired, an event log message can be logged. In one implementation, a firewall session (i.e., a parent firewall session) can have children firewall sessions. In one implementation, the clearing of a parent firewall session can clear the parent's children firewall sessions at the same time.

In one implementation, upon detecting that a GTP tunnel is torn down, one of the GTP or the Gi Firewall can implement policy management that determines what action to take, as shown in FIG. 5. That is, rather than immediately invalidating a firewall session, one or more policies can be examined to determine an appropriate action. For example, after an event occurs, such as a mobile station 115 detaching from the network, the associated GTP tunnel can be torn down. The GTP Firewall 143 is operable to detect the GTP tunnel tear down (step 405). The GTP Firewall 143 can determine whether the firewall session associated with the GTP tunnel 135 should be cleared by examining one or more policies (step 413). If the GTP Firewall 143 determines that the firewall session should be cleared (the "yes" branch of step 413) a message can be sent to the Gi Firewall 163 requesting that the Gi Firewall 163 to clear the firewall session (step 431). If the policy decision warrants, no message may be provided to the Gi Firewall 163 and the process can continue at step 405.

For example, a dropped call may be quickly reinitiated within a time out period that would not necessitate the clearing of the firewall session information. Some instances of GTP tunnel tear down can be caused not by a deliberate subscriber-prompted disconnect, but rather by loss of signal or other technical breakdown. Often, when a disconnect is not intended, the connection is reestablished with a short period of time, such as within two minutes. Because of this possibility, the GTP Firewall 143 can implement a wait and see policy and decide to leave the firewall session active (the "no" branch of step 413). The GTP communication module 147 can wait for a predetermined period for a reconnect request to be received. If a reconnect request is not received after the period expires, the GTP communication module 147 can send a clear firewall session message to the Gi Firewall 163 (step 431). If the mobile station attaches back onto the system within the period (the "yes" branch of 422), the GTP Firewall 143 does not send a clear firewall session message at that time. Requests are allowed to pass through the network until another GTP tunnel tear down is detected. The reconnect can be through a new GTP tunnel and assigned to the same firewall session. Allowing the GTP Firewall 143 to implement a wait and see policy prevents an unnecessary firewall session clear and new add firewall session request. As an alternative to the wait and see policy, the GTP Firewall 143 can use other factors to decide whether the clear firewall session message should be sent to the Gi Firewall 163.

Alternatively or additionally, the Gi Firewall 163 may include a policy engine that is operable to evaluate messages from the GTP Firewall 143. The policy engine can be used to determine what action to take upon receipt of notice of a GTP tunnel tear down.

In another implementation, the GTP Firewall 143 not only determines when a GTP tunnel has been torn down, but also can determine the information associated with packets that are in the GTP tunnel around the time of GTP tunnel tear down. The packets that are in the GTP tunnel are encapsulated to ensure proper routing to the end of the GTP tunnel. Within the encapsulated packet is source and destination information that does not designate the endpoints of the GTP tunnel, but rather the mobile station's IP address and the IP address of the Internet server. This information can be used to determine whether particular Internet servers are behaving maliciously. Additionally, the information can be used by the GTP Firewall 143 in determining whether a firewall session related to a GTP tunnel should be cleared from the Gi's firewall session list 169.

In addition to the messages described above, the GTP Firewall 143 can send a hello message at any time to detect a dead connection to the Gi Firewall 163. If a dead connection is detected, the connection can be re-established. The GTP Firewall 143 can detect dead connections based on idle time. After a connection is re-established, all request messages without a reply can be retransmitted.

The GTP and Gi Firewalls 143, 163 can be separate units or can be implemented in the same unit. The protocol that is used between the GTP and Gi Firewalls 143, 163 can be TCP based. This enables the system to be used with sites that do not permit UDP traffic. The communication can be separate from other traffic, so that communication can be on a private network or other secured channel. The communication between the GTP and Gi firewall can be UDP based or other packet based mechanisms. Communication between the GTP and Gi Firewall can be in-band, out of band, or a variation or change to the conventional communication mechanism between the devices (e.g., existing protocols can be adopted and modified as necessary to provide the communication specified herein between the devices).

A firewall can be partitioned into multiple virtual systems. Either or both of the Gi Firewall 163 or GTP Firewalls 143 can be within a virtual system. Each virtual system is a unique security domain and can be managed by administrators who can individualize (e.g., including setting up address books and policies) the security protections for the given domain. The Gi Firewall 163 and GTP Firewall 143 can be either in the same virtual system or in different virtual systems.

Either or both of the firewalls can be operated in a transparent mode (i.e., the firewalls can be run in different modes with awareness of routing and application or not). The Gi Firewall 163 and GTP Firewall 143 can be within the same cluster, but on different VSD groups. A Gi Firewall 163 can be partitioned into multiple virtual systems. The firewalls can be run in a 1:1, n:1 active-standby or active-active redundancy configurations.

A number of embodiments of the invention have been described. Nevertheless, it will be understood that various modifications may be made without departing from the spirit and scope of the invention. Accordingly, other embodiments are within the scope of the following claims.

What is claimed is:

1. A method of screening incoming packets, comprising:
   detecting a request to establish a connection from a first network to a packet data network;
   detecting establishment of a tunnel, where the tunnel has a support node at each end of the tunnel, one of the support nodes being a gateway to the packet data network, where the tunnel is used to convey user traffic and the user traffic through the tunnel can have one or more associated firewall sessions on a firewall outside the tunnel;
   inspecting packets in the tunnel to detect information associated with the firewall sessions;
   detecting a tear down of the tunnel in response to inspecting the packets; and
   sending a request to the firewall to clear the one or more firewall sessions in response to detecting the tear down of the tunnel.

2. The method of claim 1, where:
   detecting a tear down of the tunnel includes detecting the tear down of a GTP tunnel within the first network.

3. The method of claim 1, further comprising:
   stopping passage of packets to the first network originating from the packet data network and associated with a firewall session that is not on the firewall session list.

4. The method of claim 1, further comprising:
   dropping packets originating from the packet data network and not associated with a firewall session identifier on the firewall session list.

5. The method of claim 1, where:
   detecting the tear down of the tunnel includes detecting GTP delete tunnel request and response messages.

6. The method of claim 1, further comprising:
   clearing the one or more firewall sessions from a firewall session list.

7. The method of claim 1, further comprising:
   adding a firewall session to a firewall session list at a time when a new tunnel is created.

8. The method of claim 1, where:
   inspecting the packets in the tunnel includes determining at least one of a source address and a destination address of the packets in the tunnel.

9. The method of claim 1, where:
   detecting establishment of the tunnel includes determining the one or more firewall sessions associated with the tunnel.

10. The method of claim 9, where:
    detecting establishment of the tunnel includes determining two or more firewall sessions associated with the tunnel.

11. A system for screening incoming packets, comprising:
    a General Packet Radio Service Tunneling Protocol (GTP) firewall device to detect a tear down of a tunnel in response to inspecting packets in the tunnel to detect information associated with a firewall session on a firewall outside the tunnel, the GTP firewall device including a GTP communication module; and
    a Gi firewall device that includes:
        a Gi communication module that is operable to receive an instruction from the GTP communication module to clear the firewall session in response to the detection of to tear down of the tunnel,
        a firewall session list, and
        a tear down engine that removes inactive firewall sessions associated with the torn down tunnel from the firewall session list when the tear down engine receives the instruction from the GTP communication module.

12. The system of claim 11, where:
    the GTP firewall device is operable to detect a GTP tunnel tear down.

13. The system of claim 12, where:
    the GTP firewall device is operable to detect a firewall session end.

14. The system of claim 11, where:
    the GTP firewall device includes a Gn firewall provided at a Gn interface.

15. The system of claim 11, where:
    the GTP firewall device includes a Gp firewall provided at a Gp interface.

16. The system of claim 11, where:
    the GTP firewall device is located on a device; and
    the Gi firewall device is located on the device.

* * * * *